United States Patent [19]

McLaughlin

[11] Patent Number: 4,635,162

[45] Date of Patent: Jan. 6, 1987

[54] CONDUCTIVE FLANGES FOR PIPE FITTINGS

[75] Inventor: Hugh T. McLaughlin, Santa Ana, Calif.

[73] Assignee: Ameron, Inc., Monterey Park, Calif.

[21] Appl. No.: 796,275

[22] Filed: Nov. 8, 1985

[51] Int. Cl.⁴ .............................................. H05F 3/02
[52] U.S. Cl. ..................................... 361/215; 174/84 S
[58] Field of Search ................. 361/215; 285/405, 416, 285/423, 363, DIG. 16; 174/47, 84 S, 85, 94 S

[56] References Cited

U.S. PATENT DOCUMENTS 3,943,273  3/1976  de Putter .......................... 174/47 X
4,120,325  10/1978  de Putter ......................... 174/47 X Primary Examiner—L. T. Hix
Assistant Examiner—Douglas S. Lee
Attorney, Agent, or Firm—Christie, Parker & Hale

[57] ABSTRACT

A conductive flange is set forth for a fitting such as a conduit. The flange is non-conductive including at least one strand of conductive yarn in conductive contact with the conduit and extending to the flange rim where it intersects one or several bolt holes.

The flange is conductively attached to the conduit such that any static electrical charges are conducted by the yarn to the ounting bolt or bolts disposed in the bolt holes. The bolts are grounded to, in turn, ground the static charge and prevent sparking.

5 Claims, 4 Drawing Figures

U.S. Patent   Jan. 6, 1987   4,635,162
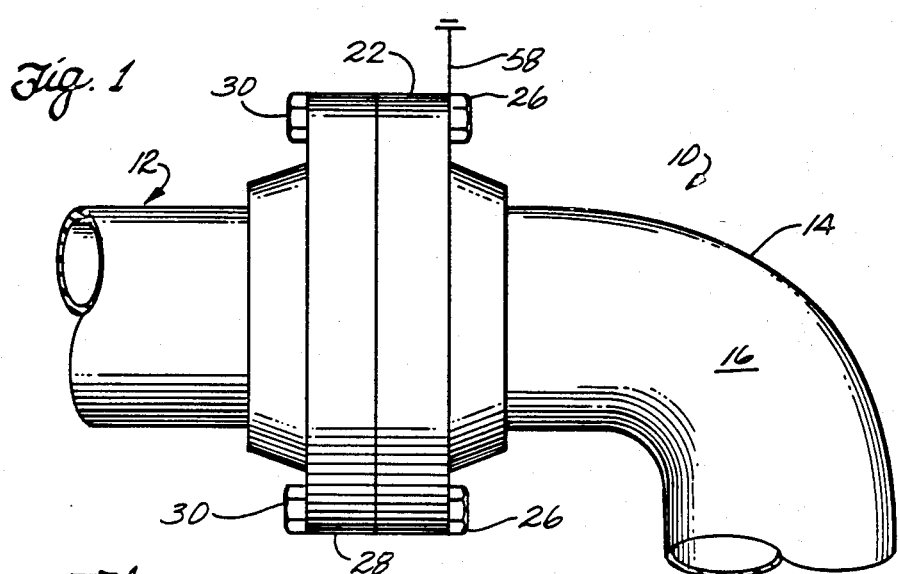
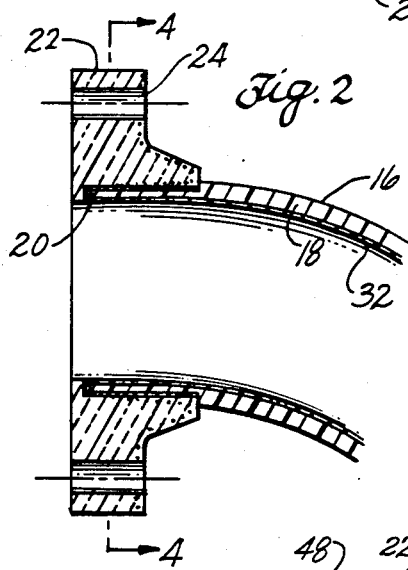
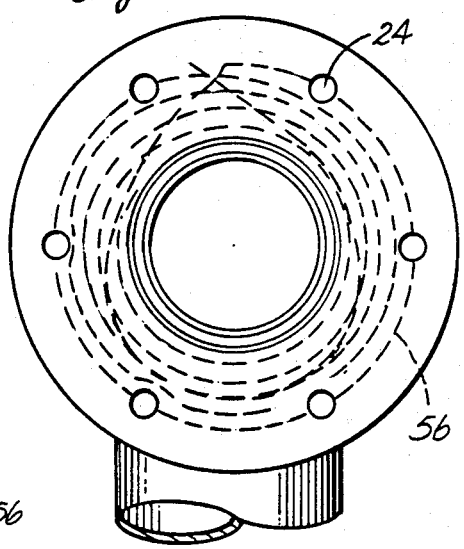
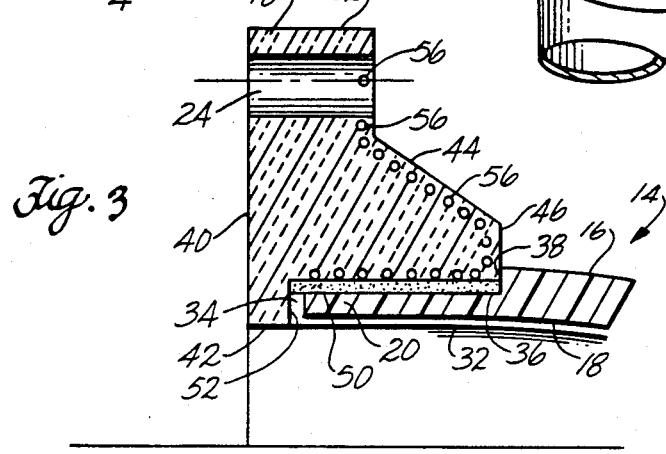

CONDUCTIVE FLANGES FOR PIPE FITTINGS

FIELD OF THE INVENTION

This invention relates to pipelines wherein static electrical charges are present. More particularly, it relates to conductive flanges for pipeline fittings.

BACKGROUND OF THE INVENTION

In pipelines fashioned from non-conductive pipes and fittings, static electrical charges can develop. The non-conductive pipeline may consist of non-metallic (e.g., fiberglass, polyvinyl chloride) components. Unless the static electrical charges are grounded, the charge may reach potentials at which arcing occurs. The spark created when the potential arcs can represent a serious danger of explosion or fire.

To ground such pipelines at least one technique has been to apply a conductive coating on the exterior of the pipe as shown in U.S. Pat. No. 3,943,273 issued 9 March 1976 to de Putter entitled "Electrically Conducting Plastic Pipe System." According to this technique, the exterior of the joined pipes are coated with a conductive material and the pipe sections are joined and include conductive sealing rings. Static electrical charges pass the coating and rings along the pipeline to a ground wire which is bonded at one or more locations along the pipeline. In one embodiment, metal strips are glued between the coated pipes and couplings to provide a conductive interconnection therebetween.

It is believed that the foregoing apparatus and technique are expensive and time consuming. The grounding connection must be attached to a pipe by means such as straps or other mechanisms.

SUMMARY OF THE INVENTION

There is, therefore, provided in the practice of the present invention a conductive flange which is adapted to join a conduit and fitting to each other and at the same time provide a continuous electrical circuit from the conduit and fitting to bolts used to secure the mating flanges of the conduit and fitting. Accordingly, any static electrical charges are conducted along the piping system which includes the conduit and fitting for grounding at a convenient location.

Toward this end, the flange includes a body fashioned from non-conductive material such as plastic, fiberglass or the like. A bore is provided in the body to receive the conduit end for mounting of the flange thereto. The conduit is preferably conductive or is non-conductive but includes conductive elements such as liners or fibers along the inside surface to conduct static charges to the flange and prevent static charges from building up in the fluid transported by the conduit. Opposite the bore the flange includes an annular rim, also of non-conductive material, including a plurality of holes drilled therethrough each receiving a conductive bolt for coupling the flange to a like flange in the pipeline. To ground static charges at least one strand of conductive yarn is incorporated into the flange. The yarn is disposed at the bore to be in conductive contact with the inside surface of the conduit and extends to the rim to intersect at least one of the holes and contact the bolt disposed therein. Means are provided, such as a grounded wire, for grounding the bolt and thereby the yarn, conduit and pipeline. Of course, since the conductive flange according to the present invention provides for a continuous conductive pathway along the piping system, grounding can take place at any suitable location in the piping system and by any suitable technique. The conductive flange is believed to be inexpensive to manufacture and provides a simple means for grounding a pipeline or portions thereof in that, particularly, grounding can be obtained by simply attaching a grounded wire to one of the flange connecting bolts.

BRIEF DESCRIPTION OF THE DRAWINGS

These and other features and advantages of the present invention will become appreciated as the same become better understood with reference to the specification, claims and drawings wherein:

FIG. 1 is a side view showing a portion of a flanged fitting attached to the pipeline;

FIG. 2 is a side section view of a conductive flange and a portion of the fitting;

FIG. 3 is an enlarged side section view of a portion of the flange and fitting;

FIG. 4 is a section view of the flange and fitting taken along line 4—4 of FIG. 2.

DETAILED DESCRIPTION

Turning to the drawings, FIG. 1 shows a fitting 10 conductive employing a flange 22 according to the present invention to couple the fitting 10 to a pipeline shown generally as 12. While the following description and drawings describe the fitting 10 as being an elbow, it is to be understood that the invention as hereinafter described can also be used with other fittings such as tees, straight pipe sections, equipment connections or the like. Further, it is to be understood that while the following description and the drawings show only one end of the fitting it is to be understood the other end is in most instances identical including another conductive flange or may be made conductive by other suitable means.

The fitting 10 includes a conduit 14 having an outside surface 16 and, as shown in FIGS. 2 and 3, an inside surface 18. The conduit 14 also has ends 20 only one of which is shown in the drawings. The fitting 10 also includes the conductive flange 22 including a plurality of bolt holes 24 adapted to receive bolts 26 for coupling the flange 22 and fitting 20 to a like flange 28 for the pipeline 12. The bolts 26 are typical metallic and are conductive. Nuts 30 cooperate with the bolts 26 for connecting the fitting 10 to the pipeline both mechanically and electrically.

While the conduit 14 may be conductive as by being fashioned from metal, the flange 22 according to the present invention is most often used with a non-conductive conduit which is made conductive by including conductive filaments, liners, coatings or the like. For purposes of this description, the conduit will be described as being nonconductive including a conductive liner for carrying any developed static electrical charges. However, it is to be understood that the conductive flange of the present invention can be used with other types of conduits.

When fluid or gas is transported through the pipeline and fitting static electrical charges may develop. Unless grounded, these charges may build until a potential is reached at which the stored static electrical charge arcs from, for example, the fitting 10 to a nearby ground such as a metal pipe support or the like. In environments where flammable materials are present, the spark generated as the static electricity arcs to ground can present a serious danger of explosion or fire.

To draw off any developed static electrical charges in the fitting 10, the conduit 14 includes a conductive liner 32 disposed over and along the conduit inner surface 18 as best shown in FIGS. 2 and 3. The liner 32 may consist of an electrically conductive sleeve bonded to the inside surface of the conduit or may be fashioned as an integral part of the conduit during the manufacture thereof. For example, where the conduit is manufactured by spirally wrapping fibers about a conduit forming mandrel, the fibers at the first or first several layers of the conduit representing the liner 32 may be conductive as by including one or many electrically conductive strands of carbon, metal or metal coated glass. The liner 32 covers the inside surface 18 and envelops the end 20 to include a portion 34 overlaying the outside surface 16 adjacent the conduit end 20. A recess 36 extending inwardly from the end 20 to an annular shoulder 38 is provided for purposes which will hereinafter become evident.

As can be appreciated, any static electrical charges developed in the conduit will be conducted by the liner 32 to the portion 34.

To ground the static electrical charges conducted by the liner 32, the conductive flange 22 is provided. Flange 22 includes an annular face 40 which, when the fitting 10 is coupled to the pipeline 12 abuts a cooperative face for the pipeline flange 28. Suitable seals or sealing compounds may be disposed between the flanges to prevent leakage. The flange 22 has an inside diameter as represented by cylindrical wall 42 (FIG. 3) selected to have a diameter to mate with the inside diameter of the liner 32.

Opposite the face 40, the flange 22 includes a cylindrical, threaded or conical collar 44 which tapers outwardly from an annular butt end 46 to an annular rim 48 which accommodates the bolt holes 24. Fashioned in the collar 44 from the butt end 46 is a bore 50 of a diameter slightly greater than that of the recess 36 but less than the diameter of the conduit outside surface 16. The axial length of the bore 50 is slightly greater than the axial length for the recess 36, the terminus of the bore 50 defining an annular bottom 52.

Accordingly, as shown in FIGS. 2 and 3, the flange 22 is adapted to be slipped over the conduit end 20 to a position where the end 20 and portion 34 abut the bore bottom 52. To attach the flange 22 conductive adhesive 54 may be applied between the bore 50 and bottom 52 and at the recess 36 and shoulder 38 to securely bond the flange to the conduit 14.

As stated above, the flange 22 is conductive. Flange 22 is fashioned from a non-metallic material such as fiberglass. To render the flange 22 conductive it includes a conductive yarn strand 56 incorporated therein which extends continuously from the bore 50 to the rim 48 to intersect the bolt holes 24. As best shown in FIGS. 3 and 4, strand 56, during the manufacture of the flange 22 is spirally wrapped along the length of the bore 50, the strand 56 being presented to contact the conduit end 20 or to be contacted by the adhesive 54. Near the butt end 46, but disposed within the flange, the strand 56 spirals radially, on the surface of the flange, outward following the contour of the butt end 46 and collar 44 to the rim 48. One or several turns of the strand 56 cut across and contact the other spirally wrapped strand portions in the flange such that when the bolt holes 24 are drilled electrical continuity is maintained. As can be appreciated, by virtue of the conductive adhesive 54, the liner 32 and liner portion 34 are in conductive contact with the strand 56. At the bolt holes 24 the strand 56 is in conductive contact with the conductive bolts 26 nuts or washers. At one or several of the bolts 26 a ground, shown as wire 58 is provided to conduct static charges to ground. Strand 56 may be fashioned from copper, steel or any other conductive filament; however, preference may be given to non-corrosive conductors such as carbon fibers.

It follows that any developed static electrical charges in the fitting 10 are conducted through the liner 32 to the portion 34 at the conduit ends 20, through the conductive adhesive 54 to the strand 56 and ultimately through the bolt 26 to ground. The foregoing is believed to represent an advance in conductive flanges in that the non-conductive flange is rendered conductive by at least one strand of conductive yarn and provides for grounding of static electrical charges by a wire conveniently attached at one of the flange bolts. Further, the conductive strand is safely incorporated into the flange protecting it from damage and corrosion.

While I have shown and described certain embodiments of the present invention, it is to be understood that it is subject to many modifications without departing from the spirit and scope of the invention set forth herein.

What is claimed is:

1. A conductive flange adapted to be secured to a conduit end to ground static electrical charges comprising:

a body of non-conductive material having an axial bore to receive the conduit end and an annular im including a plurality of holes to receive electrically conductive bolts for coupling to a like body;

at least one strand of conductive yarn incorporated into said body, said yarn disposed at the bore to be in conductive contact with the conduit and extending to said rim to be in conductive contact with at least one of the said bolts; and means for grounding said one bolt such that the yarn and conduit will be grounded to carry away static charges.

2. The flange of claim 1 wherein the body and rim are fashioned from fiberglass and the yarn is metallic.

3. The flange of claim 1 wherein the yarn is disposed at the surface of the body and rim between said bore and holes.

4. The flange of claim 3 wherein the yarn is disposed along the length of the bore in a spiral fashion.

5. The flange of claim 4 wherein the yarn is disposed to spiral outwardly from the bore to said holes and cross over itself to maintain conductive continuity throughtout the yarn after said holes have been fashioned in said body.

* * * * *

UNITED STATES PATENT AND TRADEMARK OFFICE
CERTIFICATE OF CORRECTION

PATENT NO. : 4,635,162
DATED : January 6, 1987
INVENTOR(S) : Hugh T. McLaughlin

It is certified that error appears in the above-identified patent and that said Letters Patent is hereby corrected as shown below:

In the Abstract, Front page, line 8, "ounting" should read -- mounting --.

In the Specification, Column 1, line 26, after "pass" insert -- through --; Column 3, line 62, change "outward" to -- outwardly --.

In the Claims, Column 4, line 39, change "im" to -- rim --.

Signed and Sealed this

Fifteenth Day of September, 1987

*Attest:*

DONALD J. QUIGG

*Attesting Officer*   *Commissioner of Patents and Trademarks*